United States Patent [19]

Matsuo

[11] Patent Number: 4,800,999
[45] Date of Patent: Jan. 31, 1989

[54] TRANSPORTING APPARATUS

[75] Inventor: Yukito Matsuo, Yokohama, Japan

[73] Assignee: Kabushiki Kaisha Toshiba, Kawasaki, Japan

[21] Appl. No.: 49,404

[22] Filed: May 14, 1987

[30] Foreign Application Priority Data

May 15, 1986 [JP] Japan .................... 61-109387

[51] Int. Cl.$^4$ .............................................. B65G 37/00
[52] U.S. Cl. ........................... 198/370; 198/401; 198/408; 198/412; 198/465.1; 414/277
[58] Field of Search ............... 198/346.1, 465.1, 408, 198/409, 400, 370, 401, 406, 412, 469.1, 395, 348; 406/2; 414/277–283, 266, 268, 285, 313

[56] References Cited

U.S. PATENT DOCUMENTS

| | | | |
|---|---|---|---|
| 3,260,363 | 7/1966 | Vukosic | 198/398 X |
| 3,358,808 | 12/1967 | Reynolds | 198/412 X |
| 3,602,359 | 8/1971 | Miya et al. | |
| 3,892,372 | 7/1975 | Hauber | 406/2 |
| 4,084,770 | 4/1978 | Warmann | 406/2 X |
| 4,262,792 | 4/1981 | Davies | 198/348 |
| 4,383,601 | 5/1983 | Heisler | 198/395 X |
| 4,391,560 | 7/1983 | Fardin | 198/406 X |
| 4,561,535 | 12/1985 | Taniguchi | 198/406 |

FOREIGN PATENT DOCUMENTS

| | | |
|---|---|---|
| 7047444 | 12/1970 | Fed. Rep. of Germany . |
| 2441067 | 3/1976 | Fed. Rep. of Germany . |
| 55-30726 | 3/1980 | Japan . |
| 0093007 | 5/1985 | Japan .................... 414/331 |

Primary Examiner—Robert J. Spar
Assistant Examiner—Jennifer L. Doyle
Attorney, Agent, or Firm—Cushman, Darby & Cushman

[57] ABSTRACT

A transporting apparatus having a main transport path and a plurality of incoming paths extending from the main transport path. Cases, each having a cover, are transported in the main path, with their covers facing to the right of the main transport path. A case-outlet section and a case-orienting mechanism are provided on each of the incoming paths. The case-orientating mechanism rotates a case such that the case is oriented, with its cover facing upward, when it is removed from the case-outlet section. Every case-orientating mechanisms rotates an article in the same direction, whether it is provided on an incoming path located on the right of the main transport path, or on an incoming path located on the left of the main transport path.

29 Claims, 20 Drawing Sheets

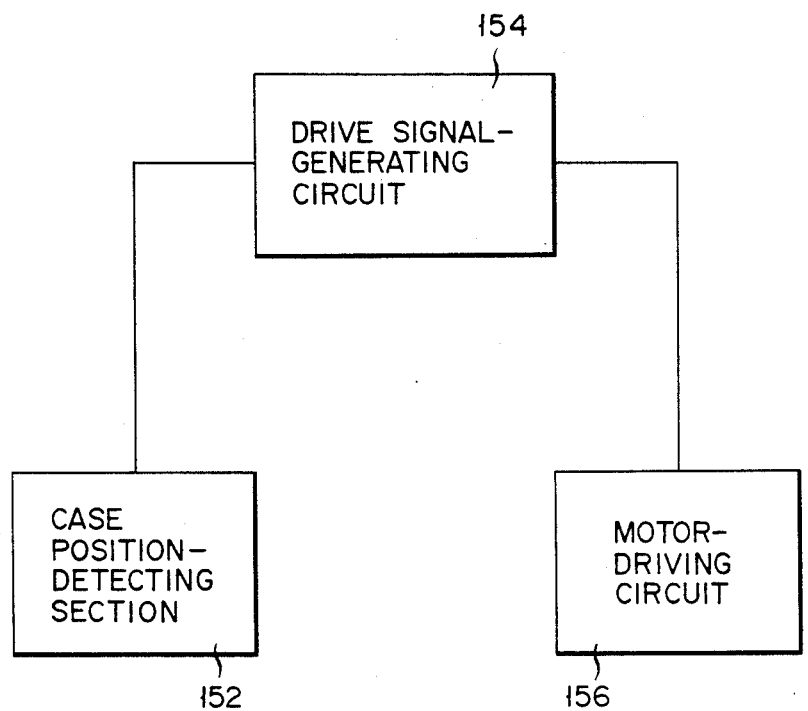
F I G. 11

TRANSPORTING APPARATUS

BACKGROUND OF THE INVENTION

The present invention relates to an apparatus for use in hospitals to transport patient's charts, slips, blood bottles, Ringer's solution bottles, and the like, or for use in post offices to transport postal matters and other things.

In a hospital, the patient's charts, various kinds of slips, and somewhat heavy articles (e.g., blood bottles, Ringer's solution bottles) are transported among a medical department and a consultation room. Two types of apparatus for transporting these articles are available at present. The first apparatus includes case conveyors for transporting patient's charts, air shooters for transporting slips, and vertical conveyors for transporting heavy articles. The second apparatus uses mobile vehicles of the same type, each for transporting patient's charts, slips and heavy articles.

In the first apparatus, patient's charts, slips and heavy articles can be transported at different speeds. However, the first apparatus occupies great floor space since it uses many and various transporting devices. The air shooter can readily covey patient's charts or the like, but can hardly convey the charts or the like and heavy articles together, in great numbers. The second apparatus is indeed efficient since it uses mobile vehicles of one kind, but the speed at which mobile vehicles can transport the articles is limited.

SUMMARY OF THE INVENTION

It is accordingly the object of this invention to provide an apparatus which uses transporters of the same type and can transport articles at high speed with a great efficiency.

According to an aspect of the invention, there is provided a transporting apparatus which comprises:

a main transport means defining a main transport path, for transporting articles in the main transport path, while orientating the articles in a specified direction;

a first incoming means defining a first incoming path extending from said main transport path into a first region provided on one side of said main transport path, and designed to transport articles in said first incoming path;

a second incoming means defining a second incoming path extending from said main transport path into a second region provided on the other side of said main transport path, and designed to transport articles in said second incoming path;

a first transferring means for transferring articles from said main transport path to said first incoming path;

a second transferring means for transferring articles from said main transport path to said second incoming path;

a first article-outlet section provided on said first incoming path, for supplying articles from said first incoming path;

a second article-outlet section provided on said second incoming path, for supplying articles from said second incoming path;

a first article-orienting means provided on said first incoming path for rotating articles in a first direction by a predetermined angle, whereby the articles are oriented in a specific manner in said first article-outlet section after the articles have been transported to said first article-outlet section;

a second article-orienting means provided on said second incoming path for rotating articles in a second direction by a predetermined angle, whereby the articles are oriented in a specific manner in said second article-outlet section after the articles have been transported to said second article-outlet section.

In the apparatus of the invention, the first and second article-transferring means are spaced apart from the main transport path. The main path can thus be as straight as possible, and articles can thereby be transported at high speed. Moreover, the articles can easily be handled since they are oriented in specified directions and then removed from the first and second incoming paths.

BRIEF DESCRIPTION OF THE DRAWINGS

FIG. 11 is a block diagram showing the control circuit used in the apparatus;

DETAILED DESCRIPTION OF THE PREFERRED EMBODIMENTS

Figure 1:
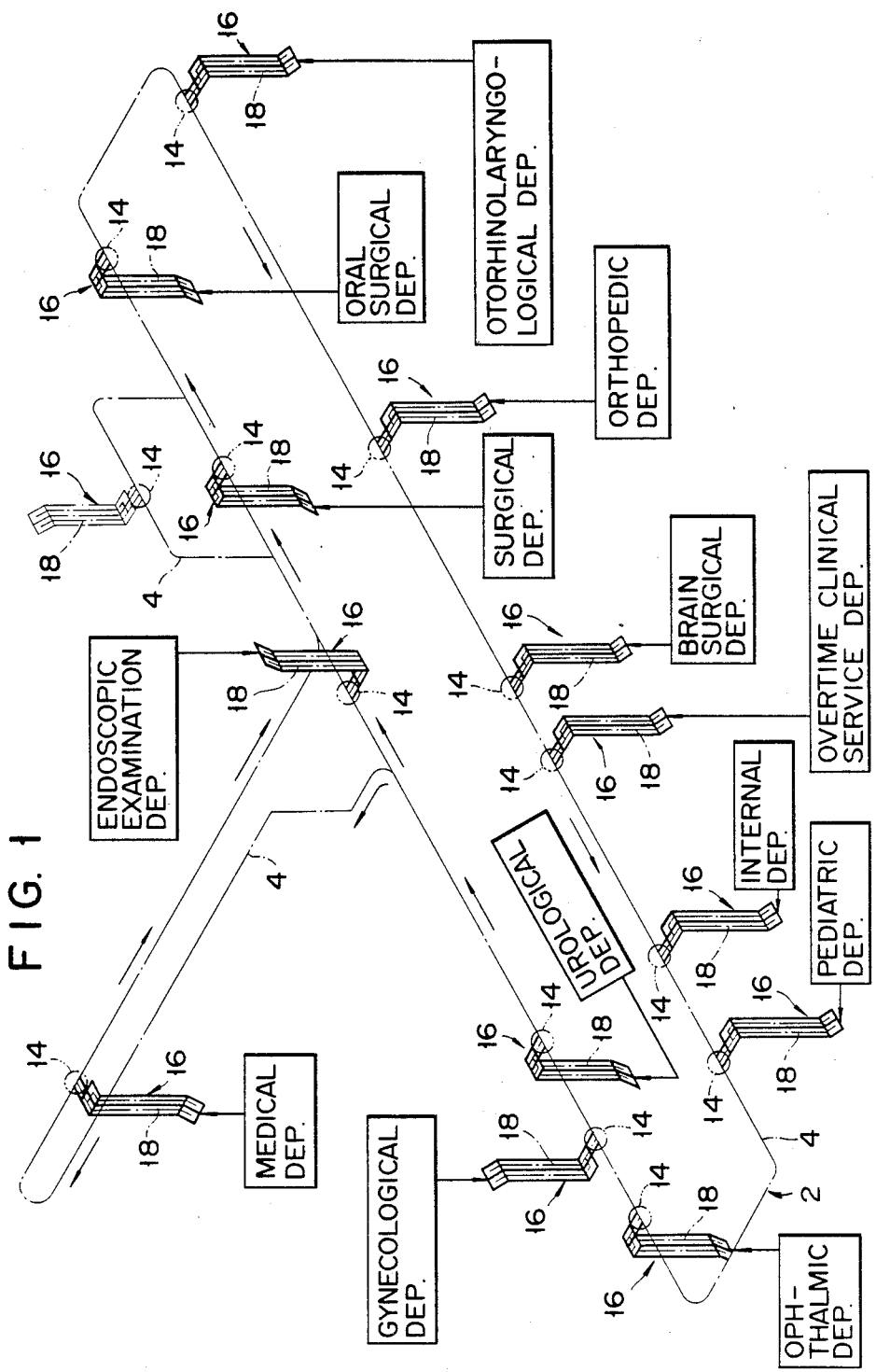
FIG. 1 is a perspective view showing a transporting apparatus according to a first embodiment of the present invention.
Figure 2:
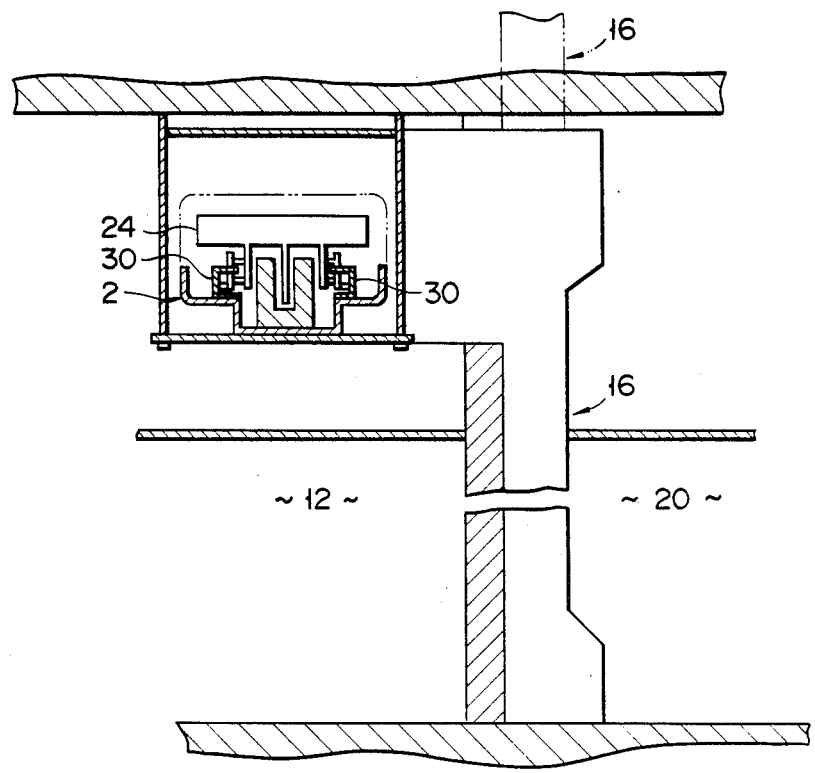
FIG. 2 shows the positional relationship between the main transport device and one of auxiliary transport devices, all used in the apparatus shown in FIG. 1.

FIG. 1 shows a transporting apparatus, i.e., a first embodiment of the present invention. This apparatus comprises main transport device 2 and auxiliary transport devices 16. Main transport device 2 has main transport path 4. Path 4 consists of a first main transport path and a second main transport path. The first main transport path is a circuit, and the second main transport path incomings from a specific part of the first main transport path and outgoings to this part thereof. The apparatus is designed to transport cases 6 (shown in FIG. 6) in main path 4.

Main transport device 2 is suspended from the ceiling of hallway 12 such that main transport 4 is horizontally positioned. Stations 14 are provided on main transport path, and are spaced apart at intervals along the main transport path 4. They horizontally extend through holes cut in either side walls into rooms 20 such as medical department, endoscopic examination department, surgical department, oral surgical department, otorhinolaryngological department, orthopedic department, brain surgical department, overtime clinical service department, internal department, pediatric department, ophthalmic department, gynecological department, and urological department.

Some of the auxiliary transport devices 16 are suspended from stations 14, and vertically extend to the floors of rooms 20, along the inner surfaces of the walls of rooms 20. Each device 16 has auxiliary transport path 18 for transporting case 6.

The other auxiliary transport devices 16 have also one auxiliary transport path 18 each. They are coupled to the remaining stations 14, and extend upwardly therefrom into rooms 20 above main transport path 4, through holes cut in the floor of these rooms 20. Hence, these auxiliary transport device 16 can transport cases 6 from main transport path 4 into the rooms one floor above path 4.

In order to transport cases 6 from path 4 into the rooms two floors upstairs, a third path indicated by a two-dot, one-dash line (FIG. 1) can be connected to the first path of main transport path 4, and an auxiliary transport device 16 also indicated by a two-dot, one-dash line (FIG. 1) can be coupled to this third path. In order to transport cases 6 into the rooms one floor downstairs, a fourth path (not shown) can be connected to the first path of main transport path 4, and an auxiliary transport device 16 (not shown, either) can be coupled to this fourth path.

Figure 3:
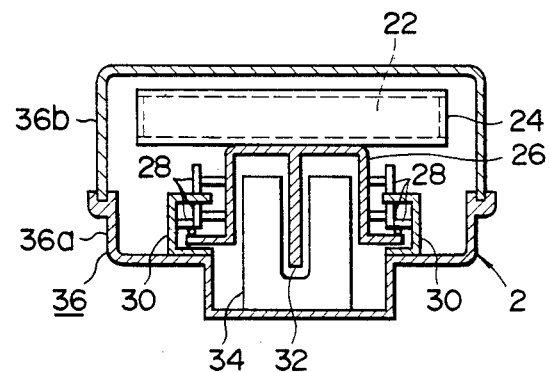
FIG. 3 is a schematic, cross-sectional view of the main transport device.

As is shown in FIG. 3, each main transport device 2 has carrier 24 having section 22 for loosely holding case 6. Carrier 24 is supported by support member 26. Support member 26 has a plurality of guide rollers 28. Guide rollers 28 are rotatably mounted on a pair of guide rails 30. Hence, carrier 24 can move at high speed in main transport path 4.

Reaction plate 32 projects downward from the lower surface of support member 26. Stators 34 are provided along main transport path 4. Stators 34 have a groove each, and are located such that reaction plate 32 is inserted in this groove. Each stator 34 and any reaction plate 32 inserted in the groove of stator 34 constitute a linear motor; stator 34 and reaction plate 32 function as a primary conductor and a secondary conductor, respectively. When an electric current is supplied to stator 34 from a power supply (not shown), a magnetic flux is applied to reaction plate 32. The intensity of the magnetic flux changes with time, whereby plate 32 is pushed forward or braked in main transport path 4. As a result, carrier 24 is driven forward or stopped. Some of stators 34 are provided in stations 14, respectively. Therefore, carriers 24 can be stopped at stations 14 whenever necessary.

As is shown in FIG. 3, main transport device 2 further comprises casing 36 consisting of lower half 36a and upper half 36b. Upper half 36b can be detached from lower half 36a. This facilitates inspection and maintenance of main transport device 2.

Figure 4:
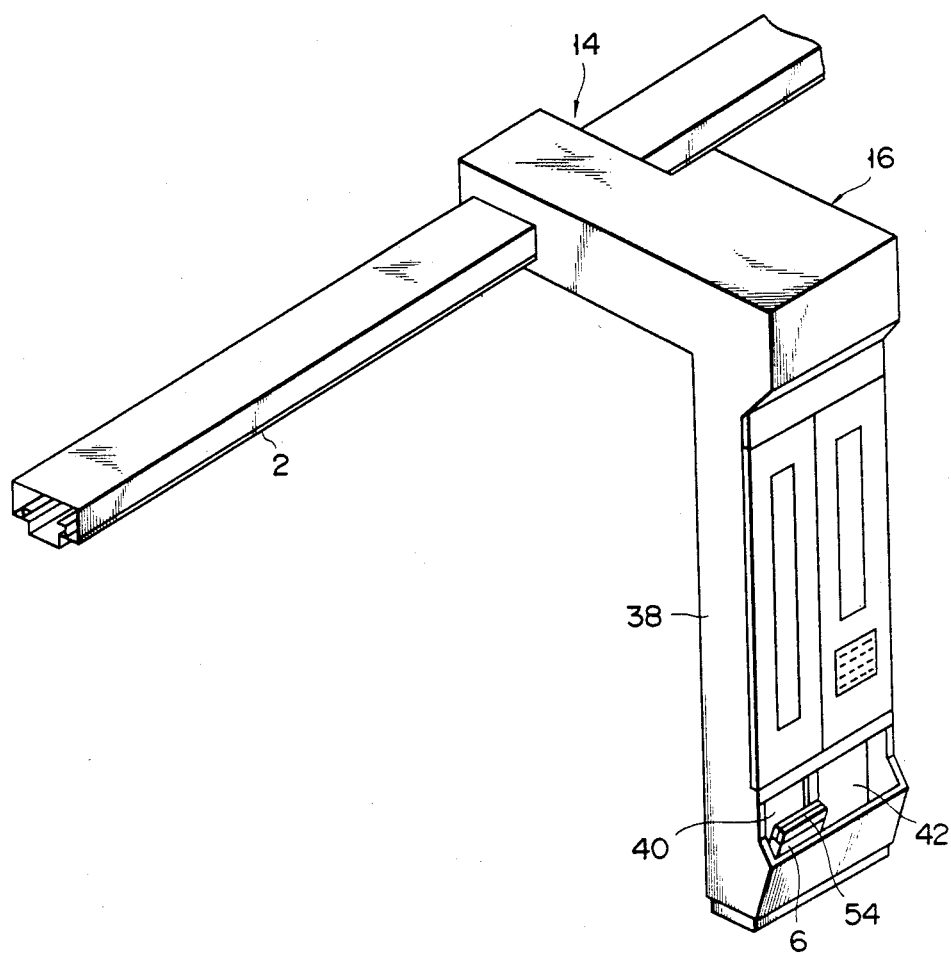
FIG. 4 is a schematic, perspective view showing part of the main transport device and one of the auxiliary transport devices.

As is illustrated in FIG. 4, each auxiliary transport device 16 comprises housing 38. Case-outlet section 40 and case-inlet section 42 is provided in the lower end portion of housing 38.

Figure 5:
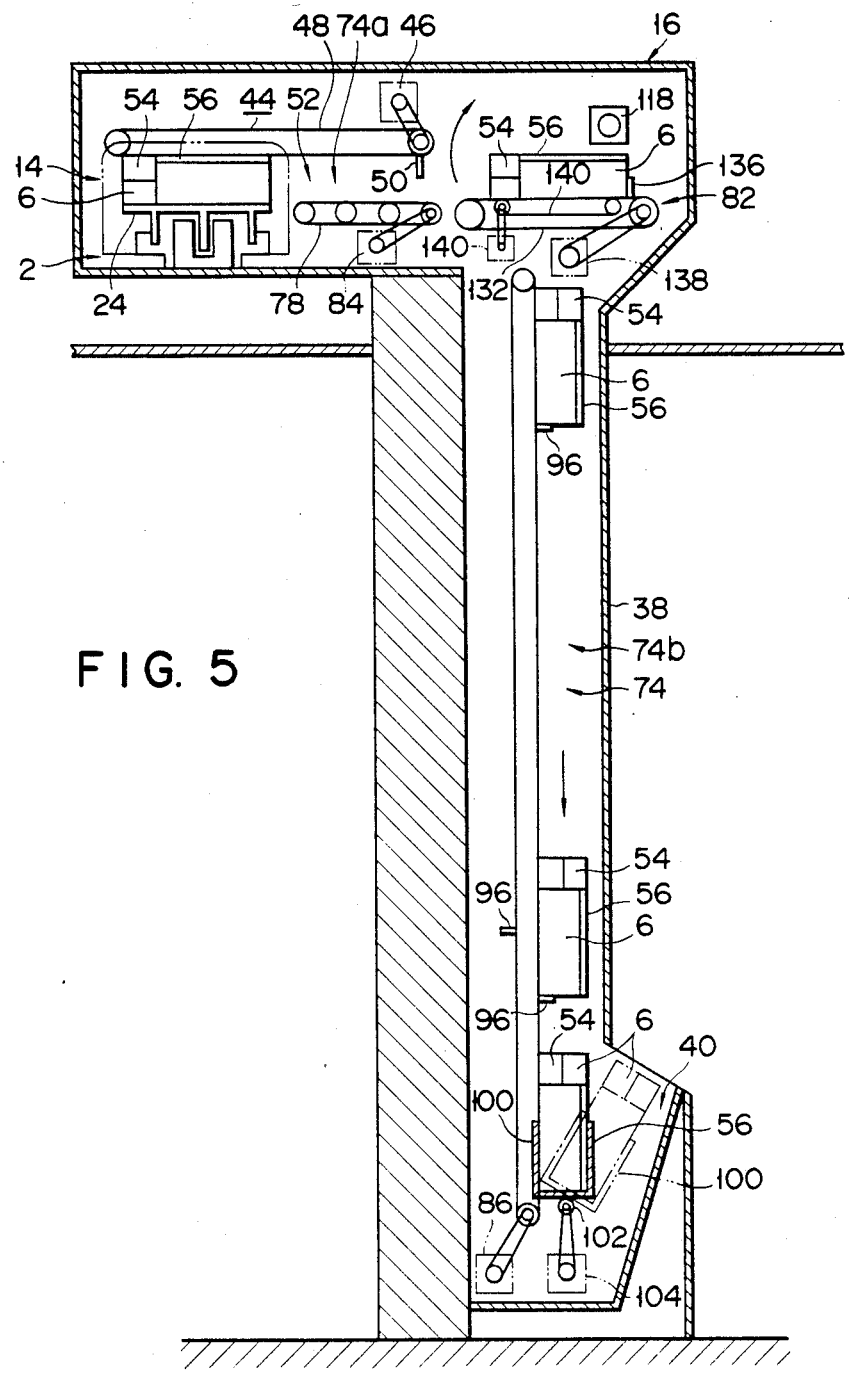
FIG. 5 is a schematic diagram showing part of the main transport device, and the inner structure of each of auxiliary transport device.
Figure 6:
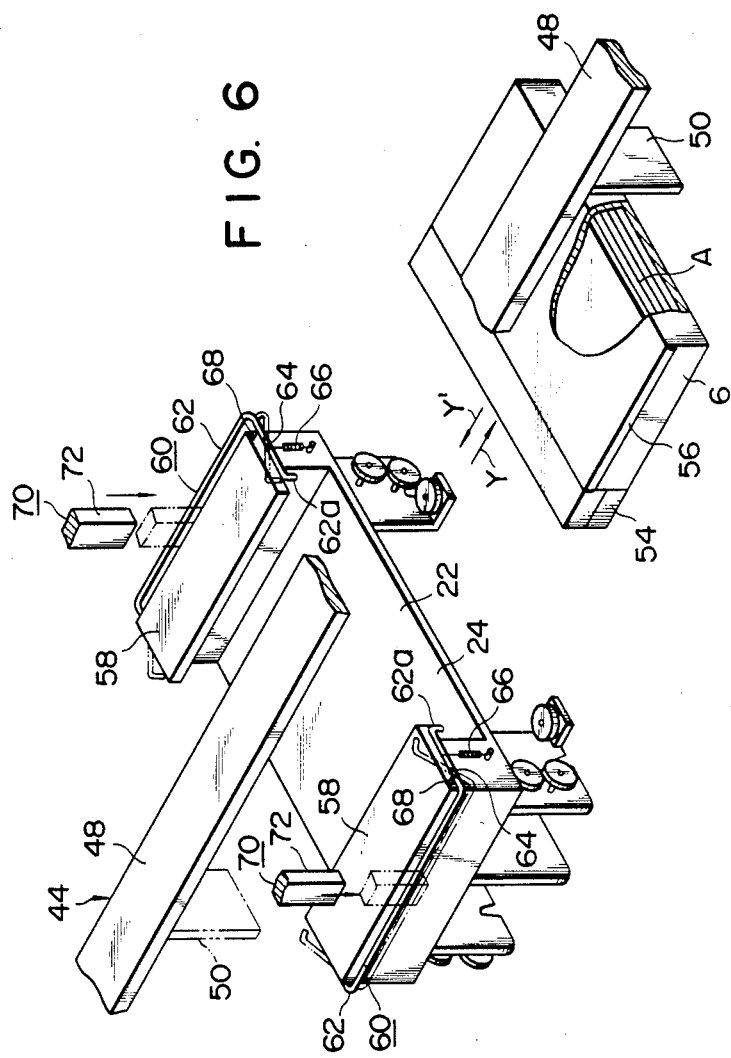
FIG. 6 is a perspective view of the article-transferring mechanism used in the apparatus of FIG. 1.

Referring to FIG. 5, article-transferring mechanism 44 is provided within each station 14. Mechanism 44 is designed to transfer case 6, containing an article A such as a patient's chart, from main transport device 2 to auxiliary transport device 16, or vice versa. Article-transferring mechanism 44 has timing belt 48 which is driven by pulse motor 46 as is shown in FIGS. 5 and 6. Pushing plate 50 is connected to timing belt 48, and moves back and forth in the direction at right angle to main transport path 4, as pulse motor 46 drives timing belt 48 forwardly and rearwardly.

Pushing plate 50 is provided at such a level that it can push the one vertical side of case 6. Hence, when plate 50 moves back and forth, case 6 contained is pushed from section 22 of carrier 24 to receipt/supply section 52 of auxiliary transport device 16, or pushed from section 52 into section 22 of carrier 24.

Case 6 has cover 54 which can be opened or shut. When cover 54 is opened, article A can be removed from case 6 or put thereinto. Case 6 has projection 56 on one vertical side. As is shown in FIG. 6, each carrier 24 has a pair of case-holding members 58 having an L-shaped cross section. These members 58 cooperate to loosely hold case 6 on section 22 of carrier 24. When case 6 is held by members 58, it can move sideways from main transport path 4, but cannot move up or down, or can move along main transport path 4. To prevent case 6 from moving sideways, fixing mechanism 60 is provided on carrier 24. Mechanism 60 consists of a pair of members 62 connected to case-holding members 58. Each member 62 is made of a U-shaped rod, and can rotate around a pair of pins 64 protruding from the opposing vertical sides of member 58. A pair of springs 66 urge member 62 into a position where member 62 abuts on stopper 68 protruding from one of said opposing vertical sides of member 58. Both members 62 are usually assumes positions represented by the solid lines (FIG. 6), with their free ends 62a located at the entrances to section 22 of carrier 24. As long as members 62 take these positions, their free ends 62a abut on the opposing vertical sides of case 6 and are loosely held on section 22, thus preventing case 6 from moving sideways from main transport path 4.

As is shown also in FIG. 6, each station 14 is equipped with a pair of release mechanisms 70. Mechanism 70 have one pushing rod 72 each. Both pushing rods 72 are moved downward by a cylinder (not shown), thereby pushing down the middle portions of members 62. As a result, members 58 are rotated against the forces of springs 66 into the positions indicated by two-dots, one-dash lines in FIG. 6. Free ends 62a of members 62 are thereby removed from the entrances to section 22 of carrier 24, and members 62 can no longer hold case 6 on section 22.

Figure 7:
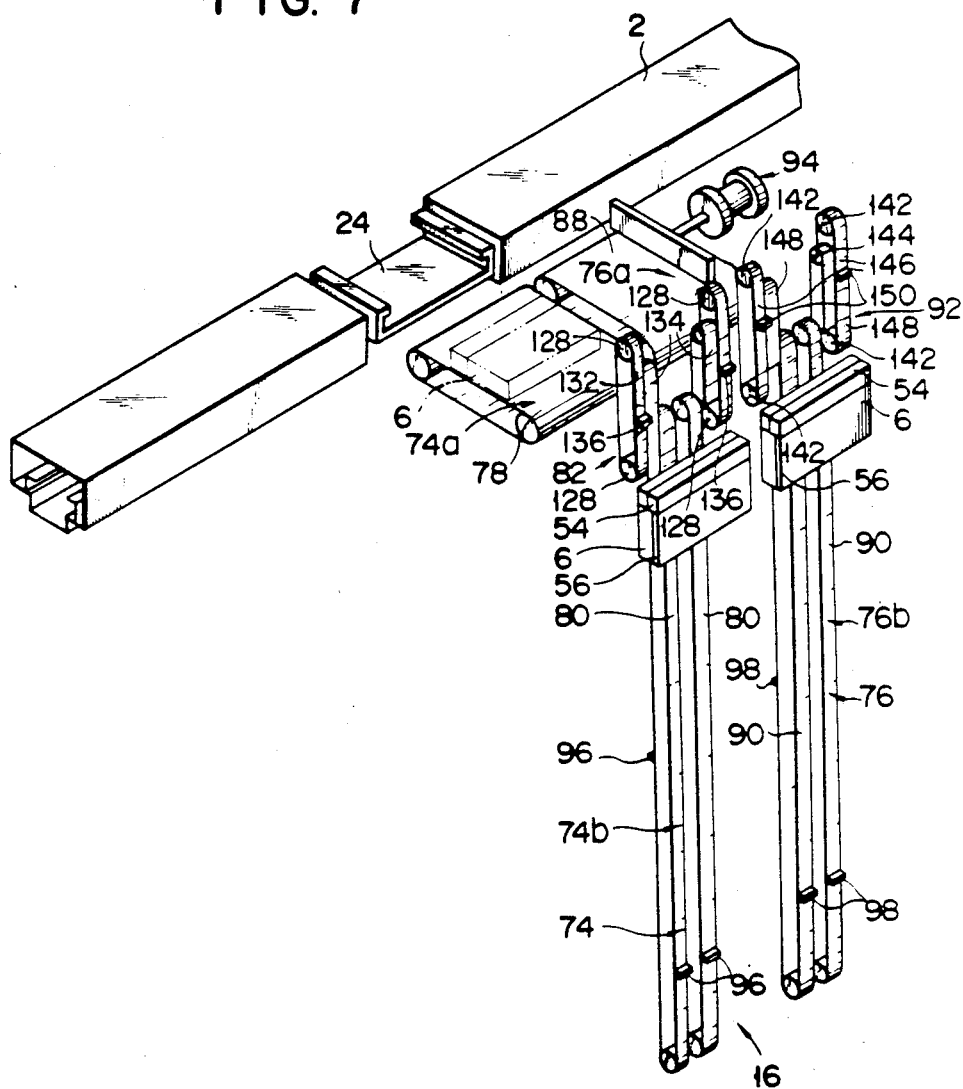
FIG. 7 is a perspective view showing the internal structure of each auxiliary transport device.

As FIGS. 5 and 7 show, each auxiliary transport path 18 comprises incoming path 74 and outgoing path 76, which are substantially parallel to each other. Incoming path 74 has horizontal section 74a, vertical section 74b, and article-orienting mechanism 82 provided between these sections 74a and 74b. Similarly, outgoing path 76 has horizontal section 76a, vertical section 76b, and article-orienting mechanism 92 provided between these sections 76a and 76b. Horizontal section 74a of incoming path 74 has horizontal belt 78 and motor 84 for driving this belt 78. Vertical section 74b of incoming path 74 has two parallel vertical belts 80 and motor 86 for driving belts 80. Horizontal section 76a of outgoing path 76 has horizontal belt 88 and a motor (not shown) for driving this belt 88. Vertical section 76b of outgoing path 76 has two parallel vertical belts 90 and a motor (not shown) for driving these belts 90.

Horizontal belt 78 of incoming path 74 is provided beside receipt/supply section 52 of auxiliary transport device 16. Therefore, when timing belt 48 is driven, case 6 can be transferred from carrier 24 onto horizontal belt 78. When horizontal belt 78 is driven by motor 84, case 6 can be transferred from belt 78 onto carrier 24. Motor 84 can rotate either forwardly or reversely. Thus, it can cooperate with timing belt, 48 to transport case 6 from carrier 24 to article-orienting mechanism 82 (later described in detail), and to transfer case 6 to carrier 24 after case 6 has been moved onto horizontal belt 78 by pushing mechanism 94 (also later described in detail).

Vertical belts 80 of incoming path 74 have pairs of claws 96 provided on belts 80 and spaced apart at intervals, each pair consisting of two claws provided on two belts 80, respectively and used to hold case 6 on vertical belts 90. When case 6 is held by a pair of claws 96, and horizontal belts 80 are driven by motor 86, case 6 is moved downwardly from article-orienting mechanism 82 to case-outlet section 40. Vertical belts 90 of outgoing path 76 have pairs of claws 98 spaced apart at intervals. Each pair of claws, which are provided on two belts 90, respectively, is used to hold case 6 on vertical belts 90. When case 6 is held by a pair of claws 98, and belts 90 are driven by the motor (not shown), case 6 is moved upwardly from case-inlet section 42 to article-orienting mechanism 92 (later described in detail).

When horizontal belt 88 of outgoing path 76 is driven by the motor (not shown), it transfers case 6 from article-orienting mechanism 92 to the position closest to receipt/supply section 52. Then, pushing mechanism 94, which is located beside horizontal belt 88, pushes case 6 onto horizontal belt 78 of incoming path 74.

As is shown in FIG. 5, case-outlet section 40 of auxiliary transport device 16 has box-like case-outlet guide 100. This guide 100 is fastened to shaft 102. When shaft 102 is rotated by motor 104, case-outlet guide 100 rotates from the vertical position, represented by the solid lines in FIG. 5, to the inclined position indicated by two-dots, one-dash lines in FIG. 5. When box-like guide 100 is in the vertical position, case 6 can enter this guide 100. When guide 100 is in the inclined position, case 6 can be removed from guide 100 and, thus, from case-outlet section 40.

Figure 8:
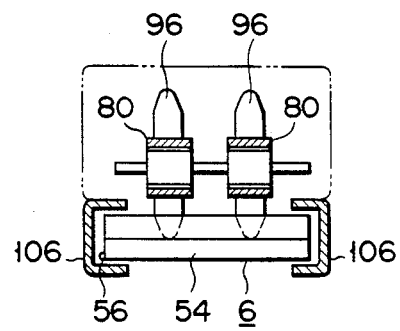
FIG. 8 is a cross-sectional view of each auxiliary transport device.

Referring to FIG. 8, incoming path 74 has a pair of case guides 106 having a U-shaped cross-section and extending along two vertical belts 80. These guides 106 guide each case 6 being transported by vertical belts 80. Although not shown, outgoing path 76 also has a pair of case guides identical to guides 106 in both structure and function.

Figure 9:
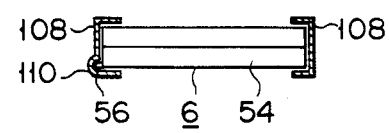
FIG. 9 is a cross-sectional view of the case-outlet section of the apparatus.

As is illustrated in FIG. 9, case-inlet section 42 has a pair of parallel case-supply guides 108 having a U-shaped cross section. These guides 108 are coupled to a shaft (not shown). When this shaft is rotated by a motor (not shown, either), guides 108 rotate from a vertical position to an inclined position, like case-outlet guide 100 provided in auxiliary transport device 16. When guides 108 are in the inclined position, case 6 can be inserted into the gap between guides 108. When guides 108 are in the vertical position, case 6 can be moved from guides 108 to vertical belts 90. One of guides 106 has groove 110 in its inner surface. Groove 110 extends in the direction in which case 6 is inserted into, and moved out of, the gap between guides 106. When case 6 is inserted into this gap, with its projection 56 loosely fitted in groove 110, cover 54 of case 6 automatically assumes an upper position. In other words, case 6 can be inserted into the gap between guides 108 only when it is so positioned that its cover 5 is turned upward.

Figure 10:
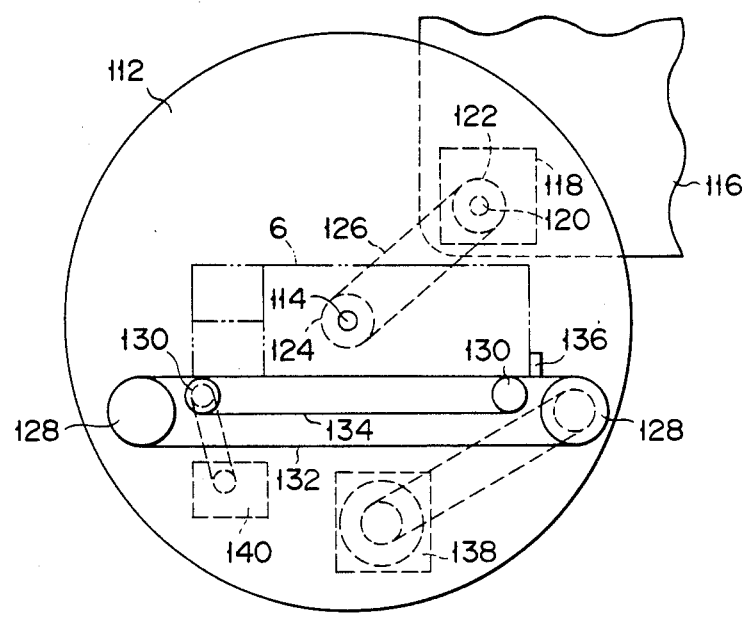
FIG. 10 is a diagram showing one of the orientation mechanisms used in the apparatus.

As is shown in FIGS. 5, 7 and 10, article-orienting mechanism 82 of incoming path 74 has a pair of rotatable frames 112 (only one shown). Both frames 112 are connected to shaft 114, which in turn is rotatably coupled to fixed frame 116. Motor 118 is mounted on fixed frame 116. Pulley 122 is connected to shaft 120 of motor 118. Pulley 124 is mounted on shaft 114. Belt 126 is wrapped around pulleys 122 and 124. Hence, when motor 118 rotates forwardly or reversely, frames 112 are rotated forwardly or reversely.

A pair of rollers 128 and another pair of rollers 130 are rotatably connected to each of rotatable frames 112, as is illustrated in FIG. 7. Belt 132 is wrapped around rollers 128, and belt 134 is wound around rollers 130. One claw 136 protrudes from belt 132 for holding case 6. Motor 138 is secured to each of rotatable frames 112. As is shown in FIG. 10, a pulley is coupled to this motor 138, and a pulley is coupled to one of rollers 128. A belt is wrapped around these pulleys. Hence, when motor 138 rotates, belt 132 is driven, thereby transporting case 6 upwardly. Motor 140 is also secured to each rotatable frame 112. A pulley is connected to this motor 140, and a pulley is coupled to one of rollers 130. A belt is wrapped around these pulleys. Hence, when motor 140 rotates, belt 134 is driven, thereby transporting case 6 upwardly, in cooperation with belt 132, since it is in a frictional contact with case 6.

Article-orienting mechanism 92 of outgoing path 76 is identical in structure to article-orientation mechanism 82 of incoming path 74, which has been described in detail. It has a pair of rotatable plates. As shown in FIG.

7, a pair of rollers 142 and a pair of rollers 144 are rotatably coupled to each of these rotatable plates. Belt 146 is wrapped around rollers 142, and belt 148 is wrapped around rollers 144. Claw 150 protrudes from belt 146.

The apparatus shown in FIG. 1 further comprises case position-detecting section 152, drive signal-generating circuit 154, and motor-driving circuit 156, as is shown in FIG. 11. Section 152 comprises a number of detectors (not shown) provided beside main transport path 4 and auxiliary transport paths 18. These detectors are used to detect cases 6 being transported in these paths 4 and 18. They output signals upon detecting cases 6. The output signal of each detector is supplied to drive signal-generating circuit 154. In response to the signal, circuit 154 produces and supplies a drive signal to motor-driving circuit 156. Upon receipt of the drive signal, motor-driving circuit 156 drives motors 118, 138, 140, etc.

Figure 12:
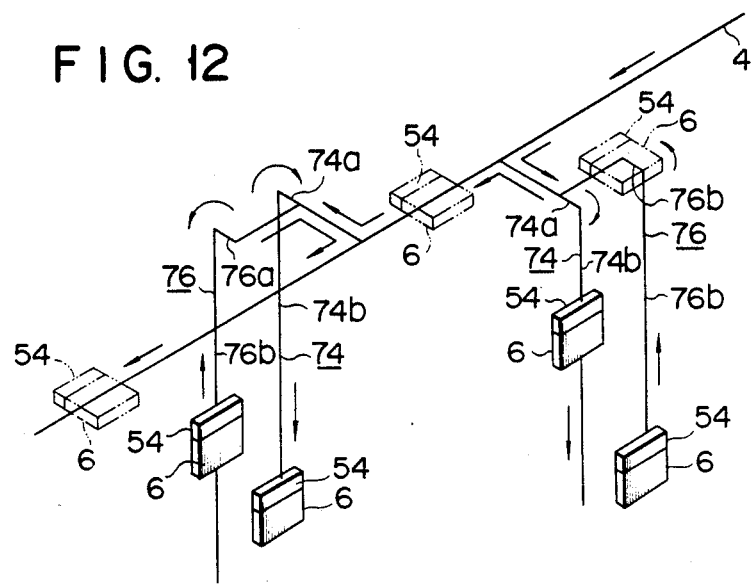
FIG. 12 is a perspective view explaining the operation of the apparatus.

The operation of the apparatus will now be described with reference to FIGS. 12, 13 and 14. It should be noted that in FIGS. 13 and 14, the numerals in parentheses designate the components of article-orientating mechanism 92 of outgoing path 76, and the numerals not in parentheses denote the components of article-orienting mechanism 82 of incoming path 74.

Figure 13:
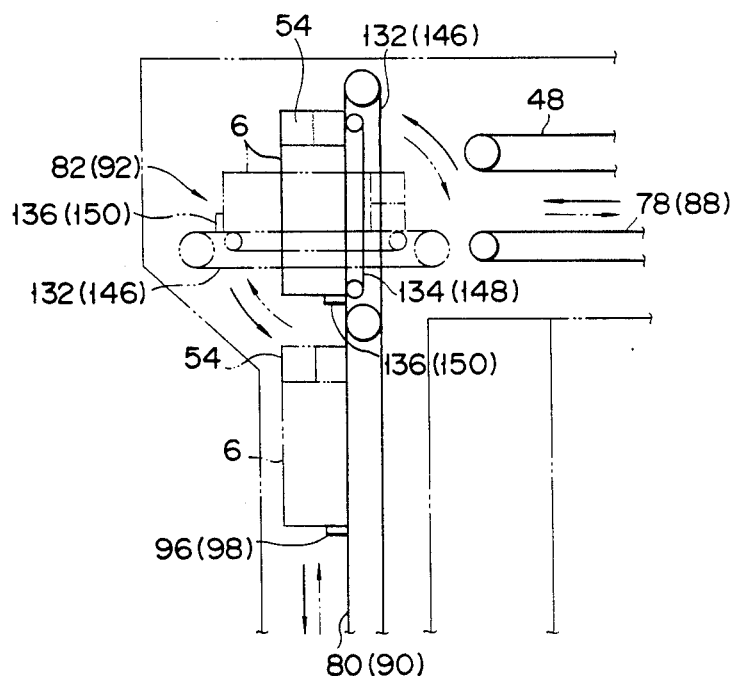
FIGS. 13 and 14 are views explaining the operation of each orientation mechanism.
Figure 14:
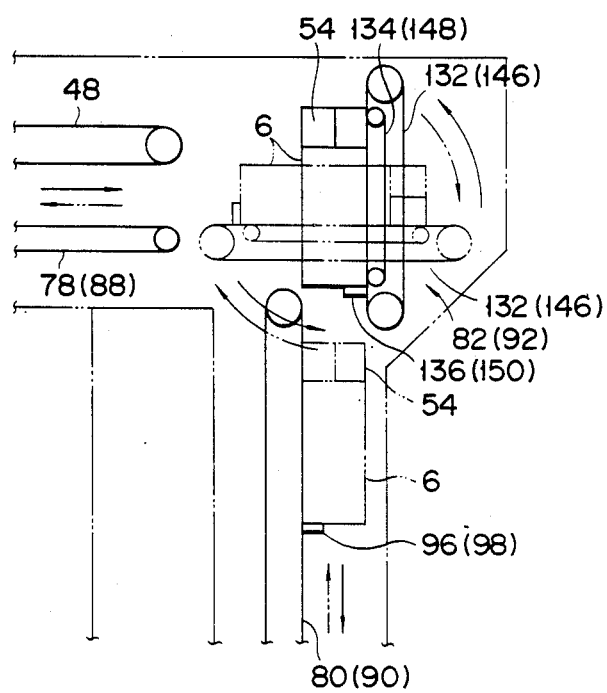

In the article-orienting mechanism 92 for each outgoing path 76 provided on the left of main transport path 4 (FIG. 12), case 6, with cover 54 facing upward, is transferred onto belts 146 from vertical belts 90 as is shown in FIG. 13. Detector 152 provided beside mechanism 92 detects case 6 now place on belts 146, and outputs a signal, in response to which circuit 154 supplies a drive signal to motor-driving circuit 156. Circuit 156 drives the motor (not shown) coupled to mechanism 92, whereby mechanism 92 is rotated clockwise by 90° from the vertical position (indicated by solid lines) to the horizontal position (represented by two-dot, one-dash lines). As a result, case 6 mounted on belts 146 is so orientated that cover 54 faces main transport path 4. In the article-orienting mechanism 92 for each outgoing path 76 provided on the right of main transport path 4 (FIG. 12), case 6, with cover 54 facing upward, is transferred onto belts 146 from vertical belts 90 as is shown in FIG. 14. Detector 152 provided beside mechanism 92 detects case 6 now placed on belts 146, and outputs a signal. Subsequently, circuit 156 drives the motor (not shown) coupled to mechanism 92, whereby mechanism 92 is rotated counterclockwise by 90° from the vertical position to the horizontal position. As a result, case 6 mounted on belts 146 is rotated until cover 54 faces away from main path 4. Hence, any case 6 transferred to main transport path 4 from each mechanism 92 is orientated such that cover 54 is at the right side of path 4.

In the article-orienting mechanism 82 for each branch path 74 provided on the left of main transport path 4 (FIG. 12), case 6, with cover 54 facing to the right, is transferred onto belts 132 from main transport path 4 as is shown in FIG. 13. The detector (not shown) provided beside mechanism 82 detects case 6 now placed on belts 132, and outputs a signal, in response to which circuit 154 supplies a drive signal to motor-driving circuit 156. Circuit 156 drives motor 118 coupled to mechanism 82 (more precisely, to rotatable frame 112), whereby mechanism 82 is rotated counterclockwise by 90° from the horizontal position (indicated by two-dot, one-dash lines) to the vertical position (represented by solid lines). As a result, case 6 mounted on belts 132 is so orientated that cover 154 faces upward. In the article-orienting mechanism 82 of each branch path 74 provided on the right of main transport path 4 (FIG. 12), case 6, with cover 54 facing to right, is transferred onto belts 132 from vertical belts 90 as is shown in FIG. 14. The detector (not shown) provided beside mechanism 82 detects case 6 now placed on belts 142, and outputs a signal. Subsequently, circuit 156 drives motor 118 coupled to mechanism 82, whereby mechanism 82 is rotated clockwise by 90° from the horizontal position to the vertical position. As a result, case 6 in case-outlet section 40 of any incoming path 74 is orientated with cover 54 facing upward.

Assume that it is necessary to transport case 6 from the case-inlet section 42 of one auxiliary transport device 16 (hereinafter called "first auxiliary transport device") provided on the left of main transport path 4, to the case-outlet section 40 of one auxiliary transport device 16 (hereinafter called "second auxiliary transport device") provided on the right of main transport path 4. In this case, the apparatus operates in the following way.

First, case 6 is inserted into case-inlet section 42 of first auxiliary transport device 16, such that projection 56 is inserted into groove 110 of case-supply guide 108. Case 6 is thereby positioned, with cover 54 facing upward. Then, case-supply guides 108 are rotated until its free ends reach positions close to vertical belts 90 outgoing path 76, which are being driven. Case 6 is moved upward, held by claws 98 to belts 90. When case 6 arrives at article-orientating mechanism 92, it is moved from belts 90 onto belts 146 of mechanism 92. Thereafter, the rotatable frame of mechanism 92 for outgoing path 76 are rotated clockwise, whereby mechanism 92 is rotated from the vertical position to the horizontal position, both illustrated in FIG. 13. When mechanism 92 is set in the horizontal position, case 6 is transported from belts 146 to horizontal belt 88. Then, pushing mechanism 94 pushes case 6 to horizontal belt 78 of receipt/supply section 52.

Case 6 is then transferred onto carrier 34 as the horizontal belt 78 of incoming path 74 and the timing belt 48 of article-transferring mechanism 44 are driven. At this time, cover 54 is positioned on the right of main transport path 4. Carrier 34 is moved forward in path 4 until it reaches the station 14 coupled to second auxiliary transport device 16. Then, as is shown in FIG. 14, case 6 is moved from carrier 24 to receipt/supply section 52, i.e., the horizontal belt 78 of incoming path 74, as timing belt 48 of article-transferring mechanism 44 is driven. Then, case 6 is transported from horizontal belt 78 onto belt 132 of article-orientating mechanism 82. Rotatable frame 112 rotates 90° counterclockwise, thereby bringing mechanism 82 from horizontal position into the vertical position. As a result, case 6 mounted on belt 78 is also rotated counterclockwise, and is vertically positioned, with cover 54 facing upward. Thereafter, case 6 is transferred from the belt 132 of article-orientating mechanism 82 to vertical belt 80. It is further transported to case-outlet guide 100, and is held by guide 100, with cover 54 still facing upward.

In the apparatus described above, main transport path 4 is separated from the case-outlet sections 40 of auxiliary transport devices 16. Hence, main transport path 4 can be provided as straight as possible, and the apparatus can therefore transport cases 6 from one room to another at high speed. Therefore, the apparatus can transport various articles, such as patient's charts, at high speed and with high efficiency. Moreover, since cases 6 are orientated in a specified direction whenever they are transported to each case-outlet section 40, it is easy for people to handle cases 6.

Figure 15:
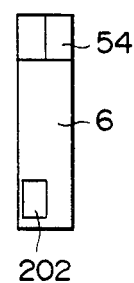
FIG. 15 is a side view of the case used in a modification of the auxiliary transport device.
Figure 16:
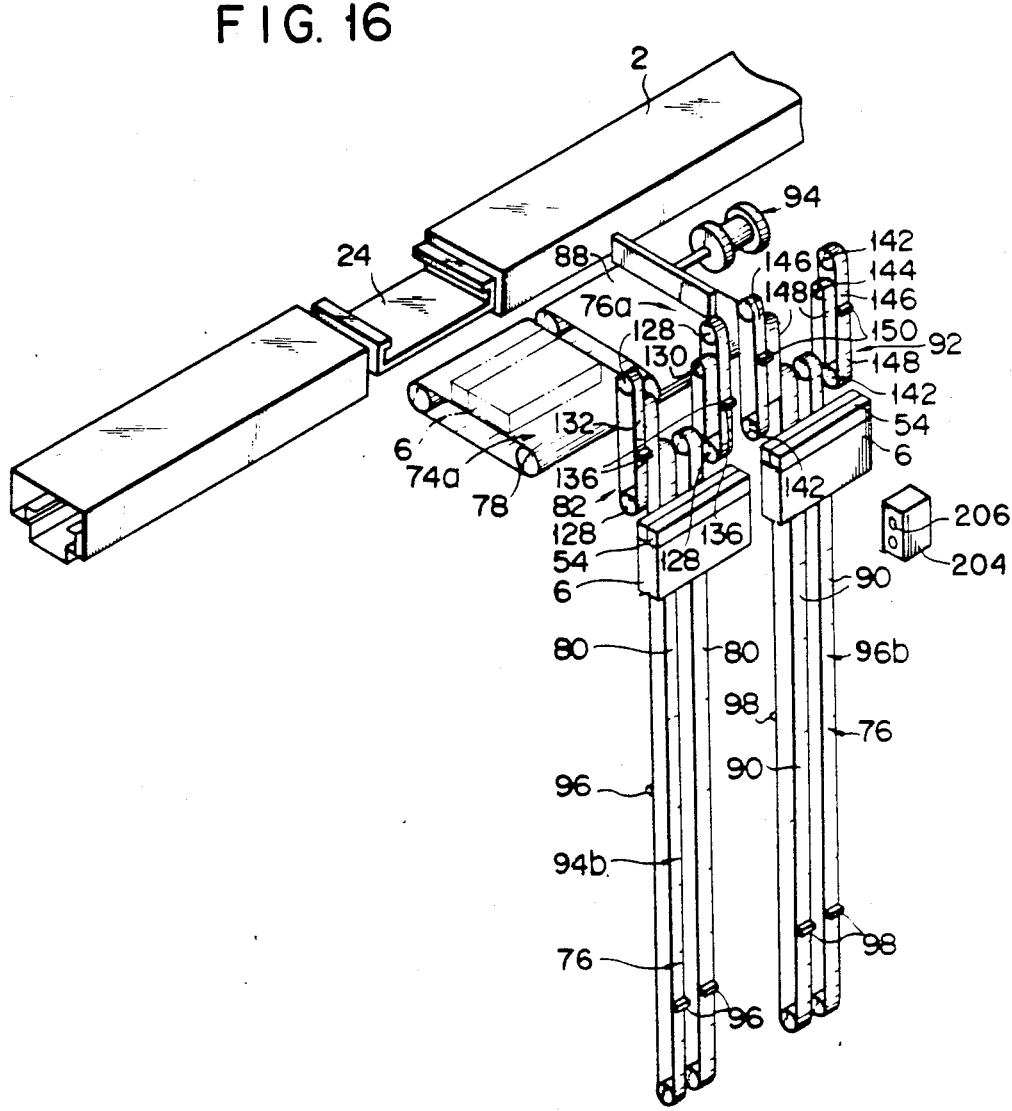
FIG. 16 is a schematic, perspective view showing part of the main transport device and the modified auxiliary transport device shown in FIG. 15.

FIGS. 16 to 20 show a modification of auxiliary transport device 16. FIG. 15 shows case 6 used in this modification of auxiliary transport device 16. As is shown in FIG. 15, case 6 has light-reflecting member 202 provided on one side. No projection is provided on any side of this case 6. Hence, the case-supply guide 108 of the modified device 16 does not have a groove 110.

Figure 17:
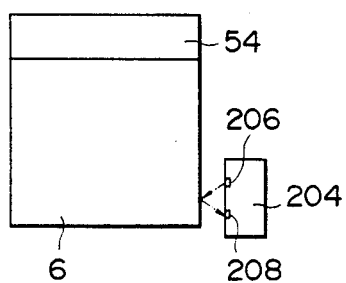
FIG. 17 shows the positional relationship between a case and a detector, both used in the modified auxiliary transport device.
Figure 18:
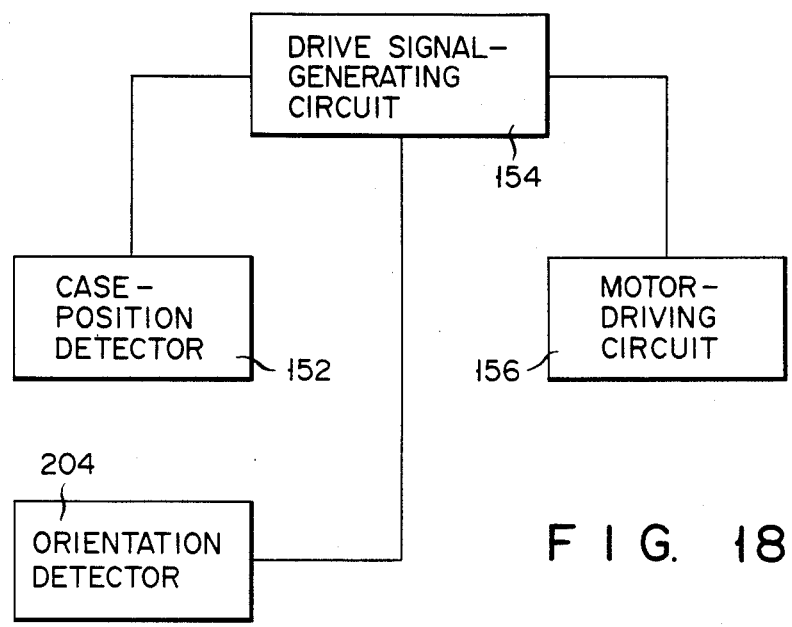
FIG. 18 is a block diagram showing the drive apparatus used in the modified auxiliary transport device.

In the modified device 16, orientation detector 204 is provided beside one of the vertical belts 90 of outgoing path 76, in order to detect the orientation of case 6. As is shown in FIG. 17, orientation detector 204 has light-emitting element 206 and light-receiving element 208. Element 206 emits light to case 6 being transported by vertical belts 90. Element 208 receives the light reflected from light-reflecting member 202 provided on case 6, thereby generating an electric signal. This signal is supplied to drive signal-generating circuit 154 (FIG. 18). In response to this signal, and on the basis of the output signals of case position-detecting section 152 (FIG. 18) and detector 204, circuit 154 produces and supplies a motor-driving signal to motor-driving circuit 156. In response to the motor-driving signal, circuit 156 drives motor 118, etc.

Figure 19:
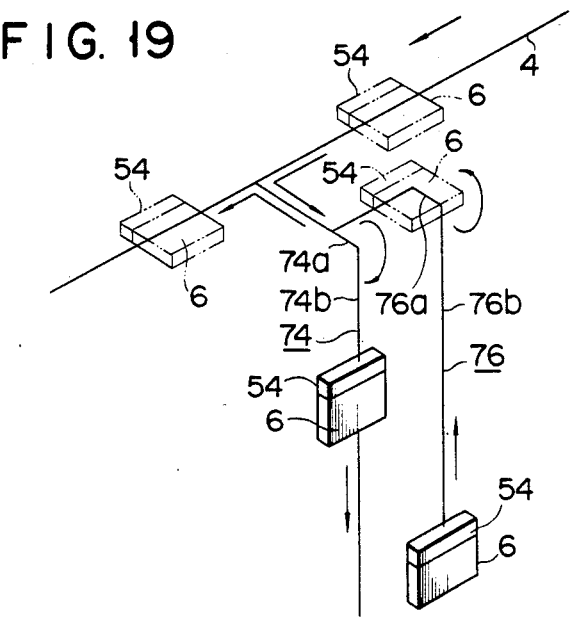
FIGS. 19 and 20 are diagrams explaining the operation of the modified auxiliary transport device.
Figure 20:
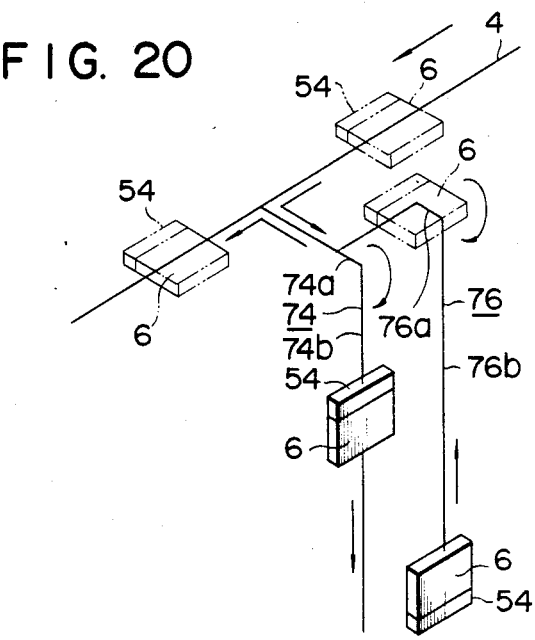

In each modified auxiliary transport device 16 provided on the left of main transport path 4, when case 6 is inserted into case-inlet section 42, with cover 54 facing upward, case 6 is rotated counterclockwise by article-orienting mechanism 92 of outgoing path 76 as is shown in FIG. 19. When case 6 is inserted into case-inlet section 42, with cover 54 facing downward case 6 is rotated clockwise by article-orienting mechanism 92 of outgoing path 76 as is shown in FIG. 20. Therefore, case 6 is positioned on main transport path 4, always with cover 54 facing to the right of path 4, no matter whether case 6 has been inserted into section 42, with cover 54 facing upward or downward.

Except for the points described above, the modified auxiliary transport device 16 shown in FIGS. 16 to 20 is identical to device 16 shown in FIGS. 4, 5, 7 and 8.

Figure 21:
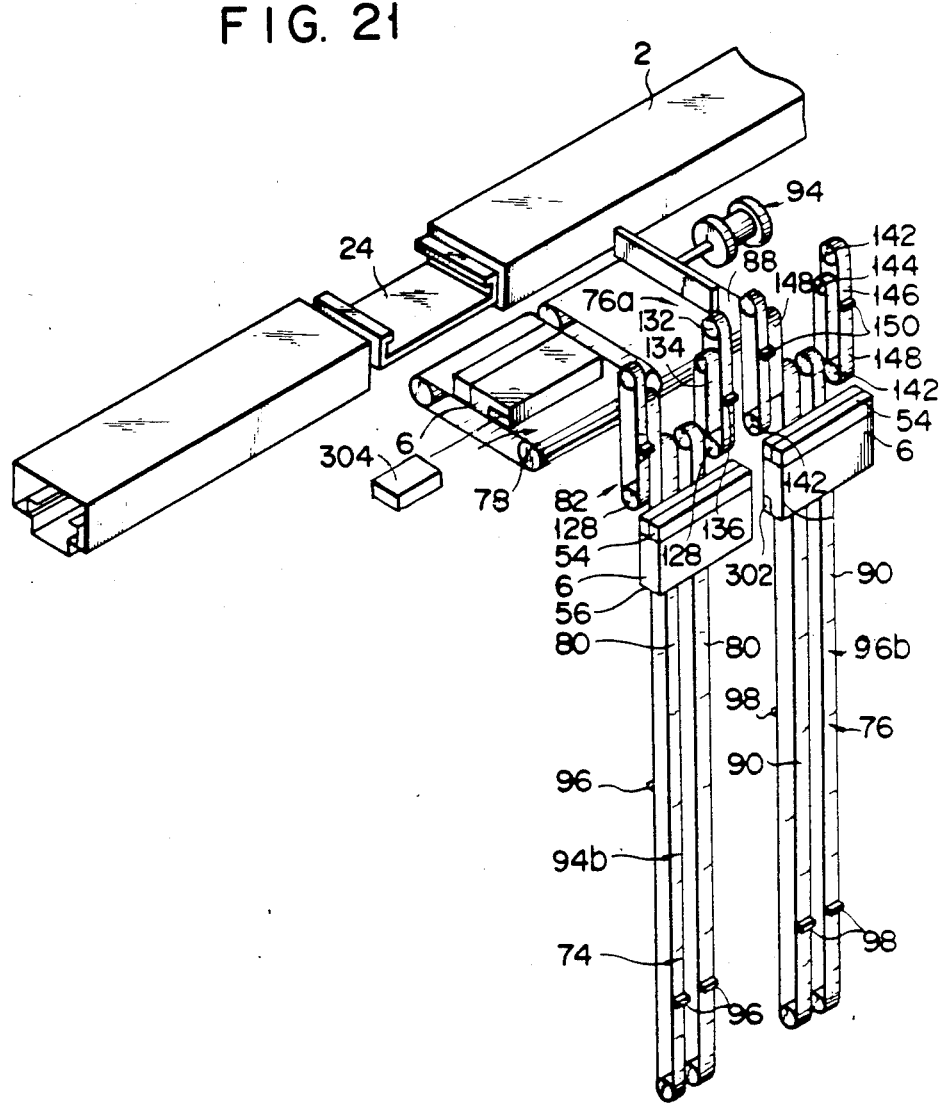
FIG. 21 is a schematic, perspective view showing part of the main transport device and one of the auxiliary transport devices, all used in a apparatus according to a second embodiment of the present invention.

FIGS. 21 to 28 show a second embodiment of the present invention. As is shown in FIG. 21, case 6 used in the third embodiment has light-reflecting member 302 provided on one side. No projection is formed on case 6. Nor is any groove 56 cut in case-supply guide 108.

Figure 22:
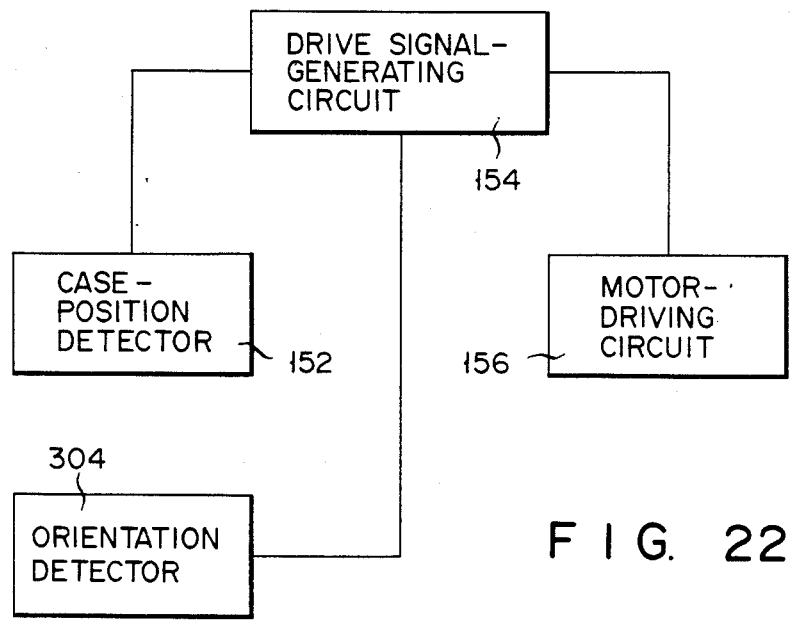
FIG. 22 is a block diagram showing the drive apparatus used in the second embodiment.

Each auxiliary transport device 16 used in the third embodiment has orientation detector 304. As is shown in FIG. 21, detector 304 emits light to case 6 being transported by horizontal belts 78 and receives the light reflected from light-reflecting member 302 provided on case 6, thereby generating an electric signal. This signal is supplied to drive signal-generating circuit 154 (FIG. 22). In response to this signal, and on the basis of the output signals of case position-detecting section 152 (FIG. 22) and detector 204, circuit 154 produces and supplies a motor-driving signal to motor-driving circuit 156. In response to the motor-driving signal, circuit 156 drives motor 118, etc.

Figure 23:
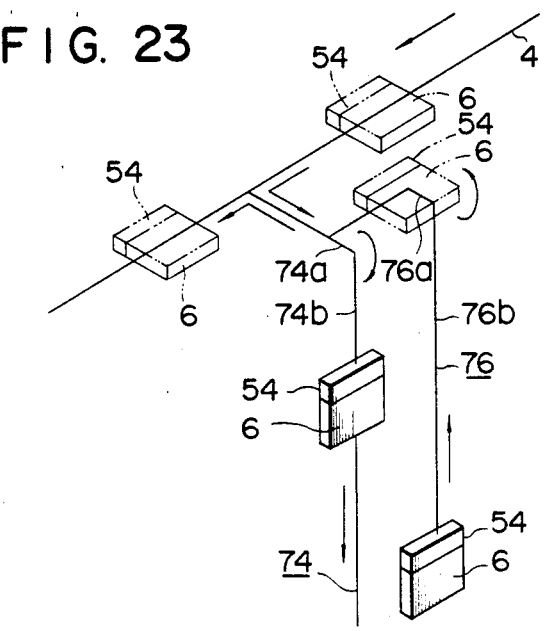
FIGS. 23 to 26 are diagrams explaining the operation of the second embodiment.
Figure 25:
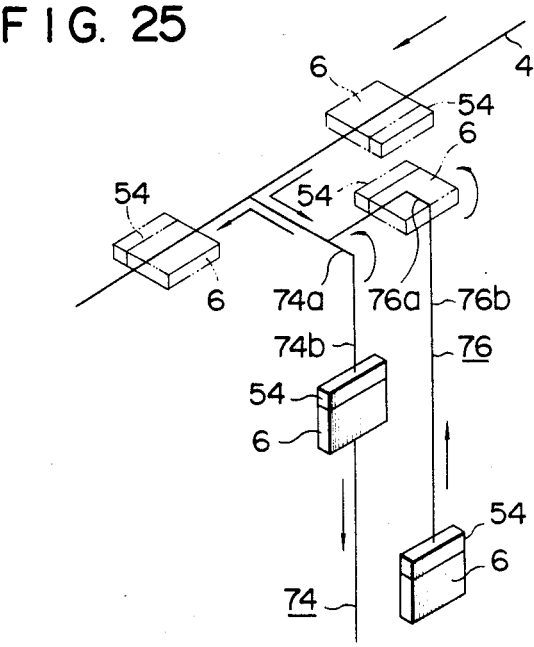
Figure 24:
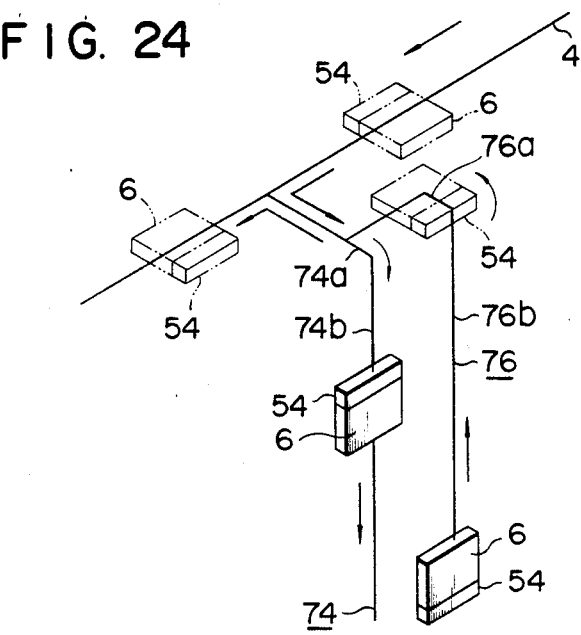
Figure 26:
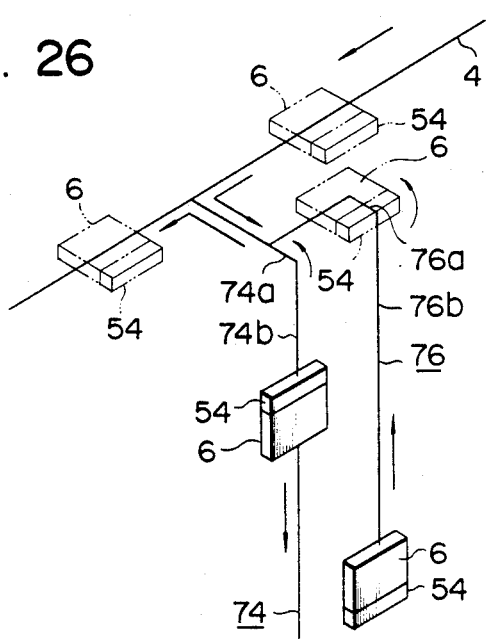
Figure 27:
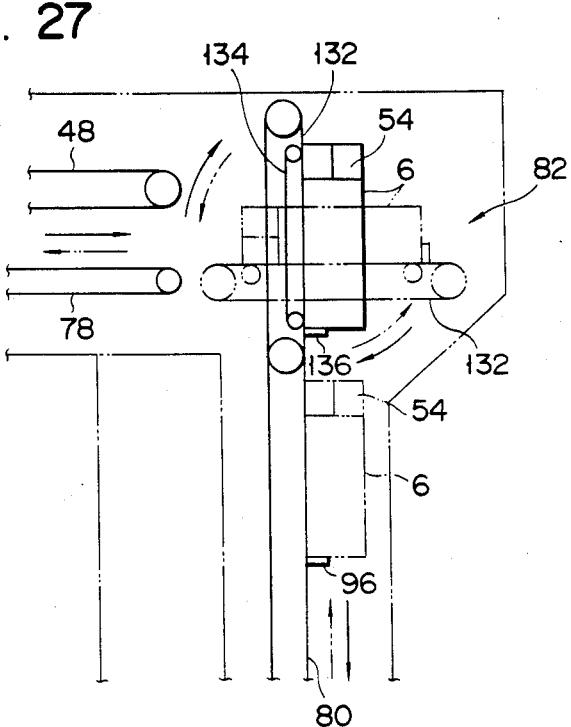
FIGS. 27 and 28 are diagrams explaining the operation of each orientation mechanism used in the second embodiment.
Figure 28:
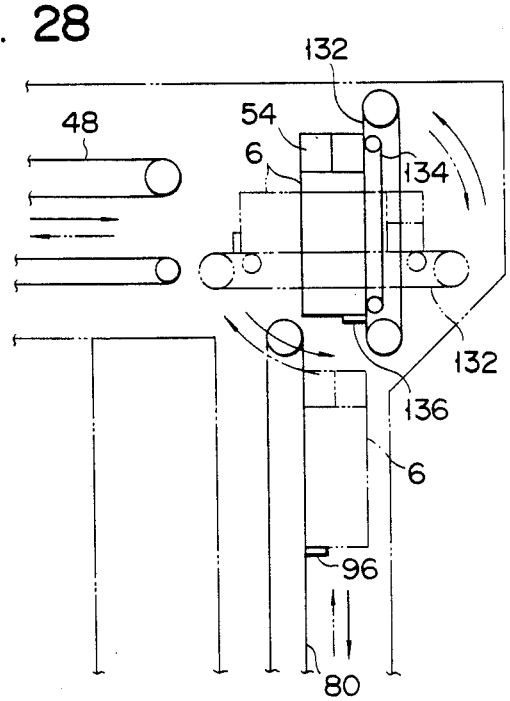

In each modified auxiliary transport device 16 provided on the left of main transport path 4, when case 6 mounted on carrier 24 is transported in path 4, with cover 54 facing to the right side of path 4 as is shown in FIGS. 23 and 24, and reaches article-orienting mechanism 82, mechanism 82 is rotated 90° clockwise as viewed in the direction opposite to the case-transporting direction in main path 4, as is shown in FIG. 27, as a result, mechanism 82 changes its position, from the horizontal position (indicated in two-dot, one-dash lines in FIG. 27) to the vertical position (indicated by solid lines in FIG. 27), whereby case 6 is also rotated by 90°, and cover 54 faces upward. Assume that case 6 mounted on carrier 24 is transported in path 4, with cover 54 facing to the left side of path 4, as is shown in FIGS. 25 and 26. In this case, when case 6 reaches article-orienting mechanism 82, mechanism 82 is rotated 90° counterclockwise, as viewed in the direction opposite to the case-transporting direction in main path 4, as is shown in FIG. 27. As a result, mechanism 82 changes its position, from the horizontal position to the vertical position, whereby case 6 is also rotated by 90°, and cover 54 faces upward. Therefore, when case 6 is subsequently transported to case-outlet section 40, it is positioned, always with cover 54 facing upward, no matter whether case 6 has been transported in path 4, with cover 54 facing left or right.

Article-orienting mechanism 92 of outgoing path 76 rotates case 6 in the same direction, whether case 6 has been inserted into case-inlet section 42, with cover 54 facing upward as is shown in FIGS. 23 and 25 or facing downward, as is shown in FIGS. 24 and 26. Hence, in the first case, case 6 will be mounted on belts 146 of article-orientating mechanism 92, with cover 54 facing to the right of main transport path 4, and in the second case, case 6 will be mounted on belts 146, with cover 54 facing to the left of path 4. Nonetheless, since article-orienting mechanism 82 rotates case 6 either clockwise or counterclockwise in accordance with the output signal of orientation detector 304 provided beside incoming path 74, case 6 is transported to case-outlet section 40 by belts 80, with cover 54 facing upward. It does not matter in what direction the case-orienting mechanism 92 for outgoing path 76 rotates.

Figure 29:
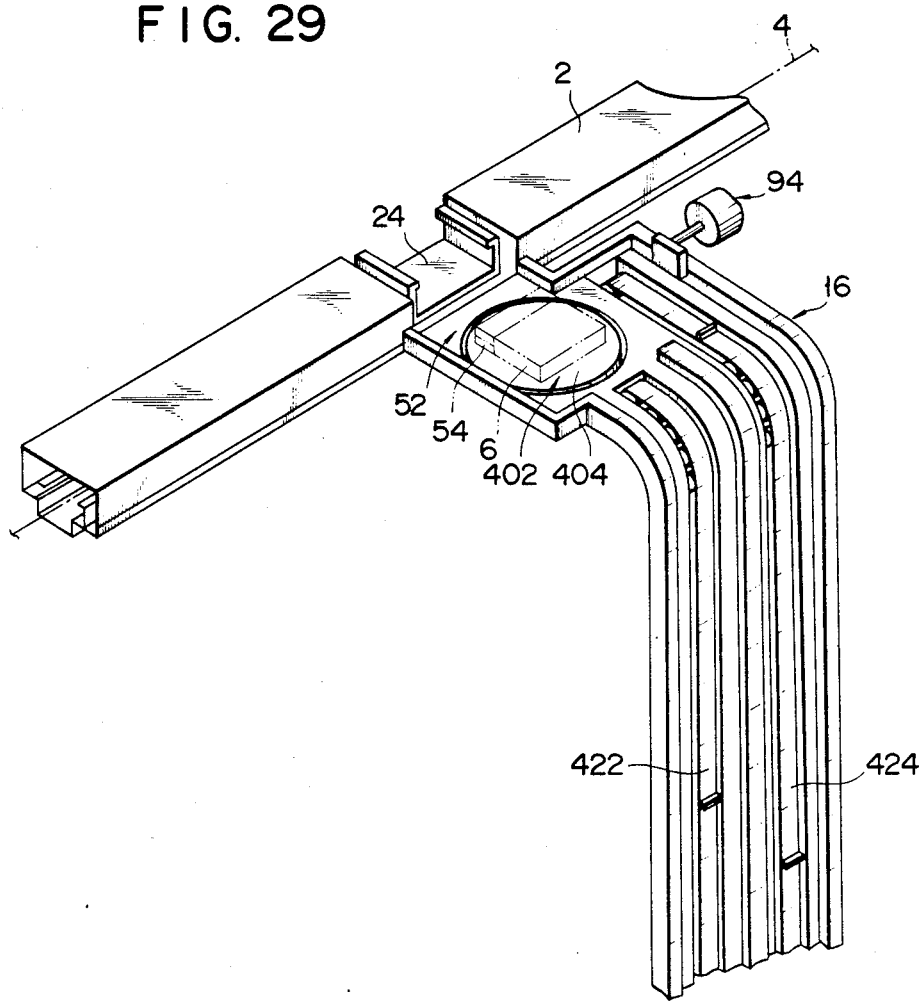
FIG. 29 is a perspective view showing the internal structure of a modification of the main transport device.
Figure 30:
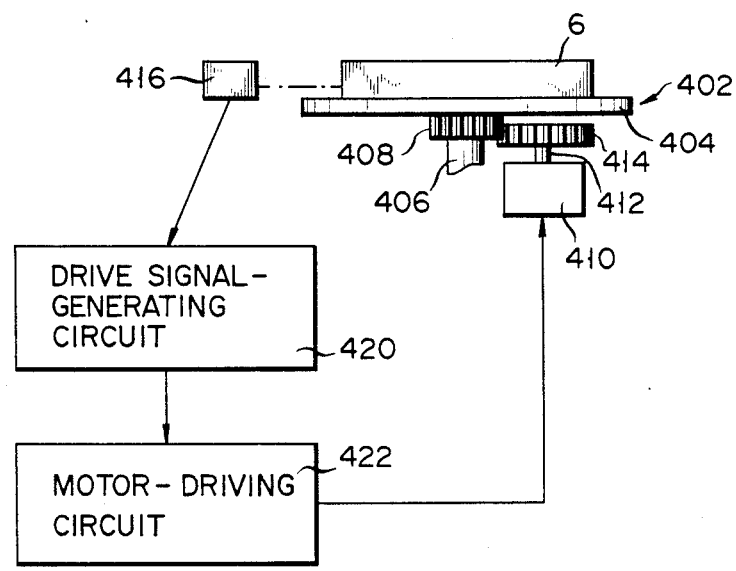
FIG. 30 is a side view illustrating the positional relationship between the turntable and detector used in the modified main transport device.
Figure 31:
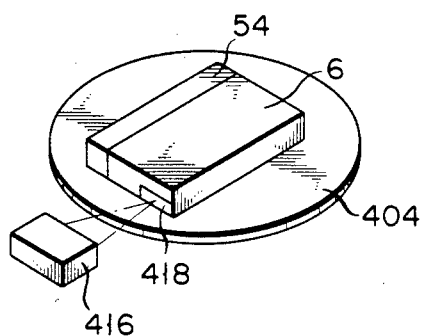
FIG. 31 is a perspective view illustrating the positional relationship between the turntable and detector shown in FIG. 30.

FIGS. 29 to 31 show a modification of auxiliary transport device 16 used in the second embodiment. As is shown in FIG. 29, this modification has article-orienting mechanism 402 in receipt/supply section 52. This mechanism 402 has turntable 404. As is shown in FIG. 30, turntable 404 is fastened to shaft 406. Driven gear 408 is mounted on shaft 406 and in mesh with gear 414 mounted on shaft 412 of motor 410. Orientation detector 416 is provided beside turntable 404. This detector 416 emits light to case 6 placed on turntable 404, and receives the light reflected from light-reflecting member 418 provided on one side of case 6, thereby generating an electric signal. The electric signal is supplied to drive signal-generating circuit 420. In response to this signal, circuit 420 generates and supplies a motor-driving signal to motor-driving circuit 422. Circuit 422 therefore drives motor 410, thereby rotating turntable 402 such that case 6 is rotated until cover 54 comes to face main transport path 4. Therefore, any case 6 transferred by article-transferring mechanism 44 from carrier 24 onto turntable 404 is automatically rotated such that case 6 is positioned in case-outlet section 40, with cover 54 facing upward. And any case 6 conveyed by belt 424 of the outgoing path from case-inlet section 42 to a position near turntable 404 is pushed onto turntable 404 by pushing mechanism 94, and is then automatically rotated to face main transport path 4.

Figure 32:
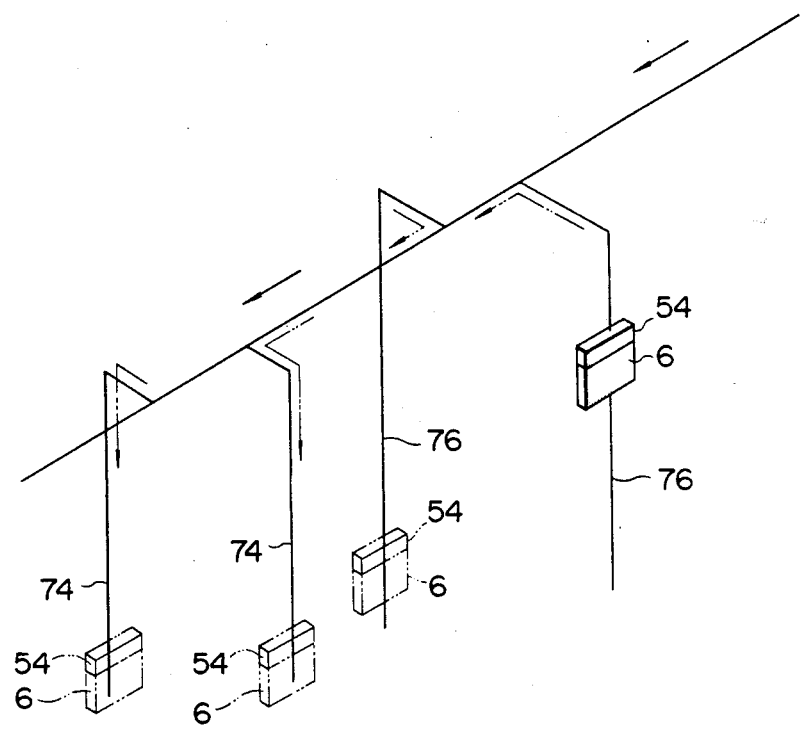
FIG. 32 is a diagram showing the positions of incoming paths.

FIG. 32 shows yet another modification of auxiliary transport device 16. This modification has only one path, either incoming path 74 or outgoing path 76. Any one of the article-orienting mechanisms described above can be used also in this modified auxiliary transport device.

What is claimed is:

1. A transporting apparatus comprising:
    a main transport means defining a main transport path, for transporting articles at high speed along the main transport path, while orienting the articles in a specified direction;
    a first auxiliary transport means defining a first incoming path extending from said main transport path into a first region provided on one side of said main transport path, and designed to transport articles along said first incoming path at a lower speed than said main transport means;
    a second auxiliary transport means defining a second incoming path extending from said main transport path into a second region provided on the other side of said main transport path, and designed to transport articles along said second incoming path;
    a first transferring means for transferring articles from and to said main transport path to and from said first incoming path, said first auxiliary transport means being joined to said first transferring means for transporting said articles toward or away from the first transferring means;
    a second transferring means for transferring articles from and to said main transport path to and from said second incoming path, said second auxiliary transport means being joined to said second transferring means for transporting said articles toward or away from the second transferring means;
    a first article-outlet section provided on said first incoming path, for supplying articles from said first incoming path;
    a second article-outlet section provided on said second incoming path, for supplying articles from said second incoming path;
    a first article-orienting means provided midway along said first auxiliary transport means for rotating articles in a first direction by a predetermined angle, whereby the articles are oriented in a specific manner in said first article-outlet section after the articles have been transported to said first article-outlet section; and
    a second article-orienting means provided midway along said second auxiliary transport means for rotating articles in a second direction by a predetermined angle, whereby the articles are oriented in a specific manner in said second article-outlet section after the articles have been transported to said second article-outlet section.

2. The apparatus according to claim 1, further comprising:
    a first outgoing means defining a first outgoing path extending from said first region to said main transport path, for transporting articles in said first outgoing path;
    a second outgoing means defining a second outgoing path extending from said second region to said main transport path, for transporting articles in said second outgoing path;
    a third transferring means for transferring articles from said first outgoing path to said main transport path;
    a fourth transferring means provided on said second outgoing path for transferring articles from said second outgoing path to said main transport path;
    a first article-inlet section provided on said first outgoing path, for supplying articles to said first outgoing path;
    a second article-inlet section provided on said second outgoing path, for supplying articles to said second outgoing path;
    a third article-orienting means provided on said first outgoing path for rotating articles in a first direction by a predetermined angle, whereby the articles are oriented in a specific manner on said main transport path after the articles have been transported to said main transport path; and
    a fourth article-orienting means provided on said second outgoing path for rotating articles in a second direction by a predetermined angle, whereby the articles are oriented in a specific manner on said main transport path after the articles have been transported to said main transport path.

3. The apparatus according to claim 2, wherein said first and second article-inlet sections have guide means for guiding articles into said first and second outgoing paths such that the articles are oriented in a specified direction.

4. The apparatus according to claim 2, wherein said first outgoing path extends parallel to said first incoming path, said second outgoing path extends parallel to said second incoming path, said first and second transferring means are used also as said third and fourth article-transferring means, respectively.

5. The apparatus according to claim 1, further comprising:
    an outgoing means defining an outgoing path extending to said main transport path, for transporting articles in said outgoing path;
    a third article-transferring means for transferring articles from said outgoing path to said main transport path;
    an article-inlet section provided on said outgoing path, for supplying articles to said outgoing path;
    a detector means for detecting the orientation of an article being transported in said outgoing path; and
    a third article-orienting means provided on said outgoing path for rotating articles in a first direction by a predetermined angle, whereby the articles are orientated in a specific manner on said main transport path after the articles have been transported to said main transport path.

6. The apparatus according to claim 5, wherein said outgoing path extends parallel to said first incoming path, and said first article-transferring means functions also as said third article-transferring means.

7. The apparatus according to claim 5, wherein said outgoing path extends parallel to said second incoming path, and said second article-transferring means functions also as said third article-transferring means.

8. The apparatus according to claim 1, wherein said articles are cases each having an inlet/outlet section through which an item is put into, and pulled out of, the case.

9. The apparatus according to claim 8, wherein said first article-orienting means orients the cases such that the inlet/outlet sections of the cases face upward when the cases are removed from said first article-outlet section, and said second article-orienting means orients the cases such that the inlet/outlet sections of the cases face upward when the cases are removed from said second article-outlet section.

10. The apparatus according to claim 1, wherein said first and second article-orientating means have article-orienting mechanisms of the same structure, which are positioned in a mirror-image relationship to each other, and each of which is able to rotate an article in a forward direction and a reverse direction.

11. The apparatus according to claim 1, wherein said first and second incoming paths have each a horizontal path section connected to said main transport path, and a vertical path section connected to this horizontal path section, said first article-orienting means is provided at the junction between the horizontal and vertical path sections of said first incoming path, and said second article-orienting means is provided between the horizontal and vertical path sections of said second incoming path.

12. The apparatus according to claim 1, wherein said first and second article-orienting means have each at least one belt for holding and transporting articles, and a rotary mechanism for rotating this belt in a vertical plane, thereby to orient any article mounted on the belt.

13. The apparatus according to claim 1, wherein said first and second article-orienting means have each a plate for supporting an article, and a rotary mechanism for rotating this plate in a horizontal plane, thereby to orient any article mounted on the plate.

14. An article-transporting apparatus comprising:
a main transport means defining a main transport path, for transporting articles at high speed along the main transport path;
an auxiliary transport means defining an incoming path extending from said main transport path, and designed to transport articles along said incoming path at a lower speed than said main transport means;
an article-transferring means for transferring articles from and to said main transport path to and from said incoming path, said auxiliary transport means being joined to said article-transferring means for transporting said articles toward or away from the article-transferring means;
an article-outlet section provided on said incoming path, for supplying articles from said incoming path;
a detector means for detecting the orientation of any article being transported along said incoming path; and
an article-orienting means provided midway along said incoming path for rotating articles in a first direction by a predetermined angle, whereby the articles are oriented in a specific manner in said article-outlet section after the articles have been transported to said article-outlet section.

15. The apparatus according to claim 14, wherein said articles have each a light-reflecting member, and said detector means optically detect the light-reflecting member, thereby to determine the orientation of the article.

16. A transporting apparatus comprising:
a main transport means defining a main transport path, for transporting articles at high speed along the main transport path;
an auxiliary transport means defining an incoming path extending from said main transport path, and designed to transport articles along said incoming path at a lower speed than said main transport means;
an article-transferring means for transferring articles from and to said main transport path to and from said incoming path, said auxiliary transport means being joined to said article-transferring means for transporting said articles toward or away from the article-transferring means;
an article-outlet section provided along said incoming path, for supplying articles from said incoming path; and
an article-orienting means provided along said auxiliary transport means for rotating articles in a first direction by a predetermined angle, whereby the articles are oriented in a specific manner in said article-outlet section after the articles have been transported to said article-outlet section.

17. A transporting apparatus, comprising:
a main transport means defining a main transport path for transporting articles at high speed along the main transport path;
an auxiliary transport means defining an auxiliary transport path extending from said main transport path and designed to transport articles along the said auxiliary transport path at a lower speed than said main transport means;
a transferring means for transferring said articles from and to said main transport means and to and from said auxiliary transport means, respectively, said auxiliary transport means being joined to said transferring means for transporting said articles toward or away from the transferring means; and
an article-orienting means provided midway along the auxiliary transport means for orienting the articles in a desired direction.

18. The apparatus according to claim 17, wherein the main transport means is a linear motor.

19. The apparatus according to claim 17, wherein the main transport means comprises a plurality of driving sections arranged so as to be spaced apart from one another and a carrier having articles disposed thereon and driven by the driving force generated from the driving sections, said carrier being moved by the inertia in the region between adjacent driving sections.

20. The apparatus according to claim 17, wherein the auxiliary transport means comprises a horizontal transport means joined to the transferring means and a vertical transport means joined to said horizontal transport means at a first end thereof, said transferring means being provided at the junction between the horizontal and vertical transferring means.

21. The apparatatus according to claim 1, wherein the main transport means is a linear motor.

22. The apparatus according to claim 1, wherein the main transport means comprises a plurality of driving sections arranged so as to be spaced apart from one another and a carrier having articles disposed thereon and driven by the driving force generated from the driving sections, said carrier being moved by the inertia in the region between adjacent driving section.

23. The apparatus according to claim 1, wherein the auxiliary transport means comprises a horizontal transport means joined to the transferring means and a vertical transport means joined to said horizontal transport means at a first end thereof, said transferring means being provided at the junction between the horizontal and vertical transferring means.

24. The apparatatus according to claim 14, wherein the main transport means is a linear motor.

25. The apparatus according to claim 14, wherein the main transport means comprises a plurality of driving sections arranged so as to be spaced apart from one another and a carrier having articles disposed thereon and driven by the driving force generated from the driving sections, said carrier being moved by the inertia in the region between adjacent driving sections.

26. The apparatus according to claim 14, wherein the auxiliary transport means comprises a horizontal transport means joined to the transferring means and a vertical transport means joined to said horizontal transport means at a first end thereof, said transferring means being provided at the junction between the horizontal and vertical transferring means.

27. The apparatus according to claim 16, wherein the main transport means is a linear motor.

28. The apparatus according to claim 16, wherein the main transport means comprises a plurality of driving sections arranged so as to be spaced apart from one another and a carrier having articles disposed thereon and driven by the driving force generated from the driving sections, said carrier being moved by the inertia in the region between adjacent driving sections.

29. The apparatus according to claim 16, wherein the auxiliary transport means comprises a horizontal transport means joined to the transferring means and a vertical transport means joined to said horizontal transport means at a first end thereof, said transferring means being provided at the junction between the horizontal and vertical transferring means.

* * * * *